Nov. 13, 1956 J. W. BANHAM, JR., ET AL 2,770,322
SPARK AND FLY ASH ARRESTOR
Filed May 20, 1954 2 Sheets-Sheet 2
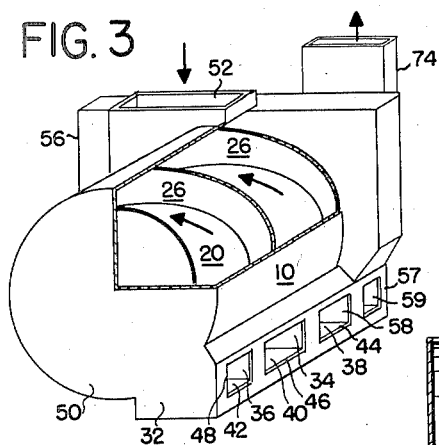
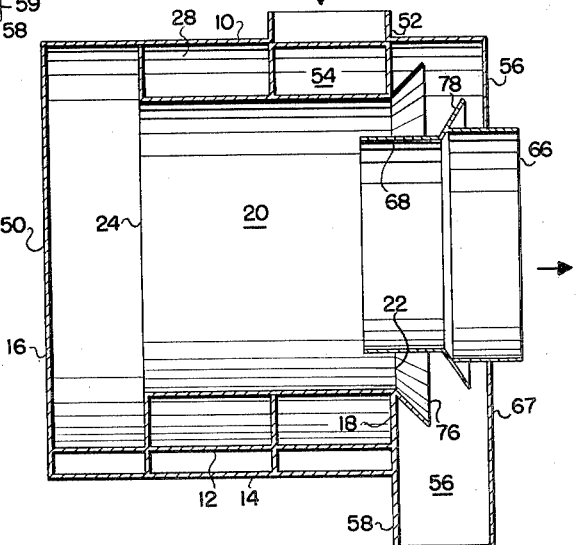
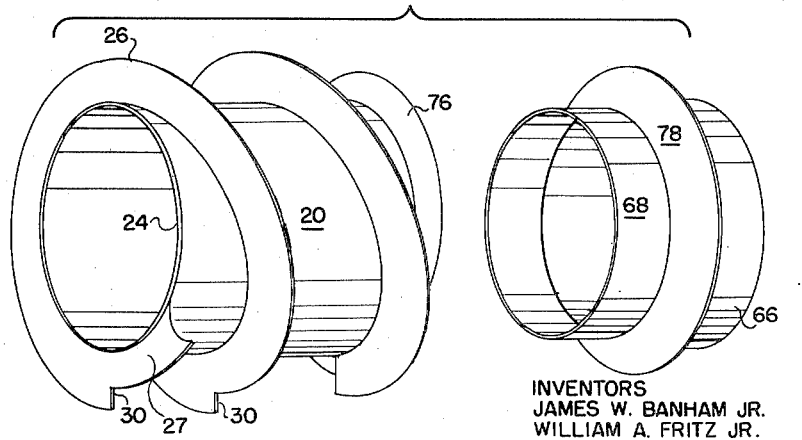
INVENTORS
JAMES W. BANHAM JR.
WILLIAM A. FRITZ JR.
BY
ATTORNEY

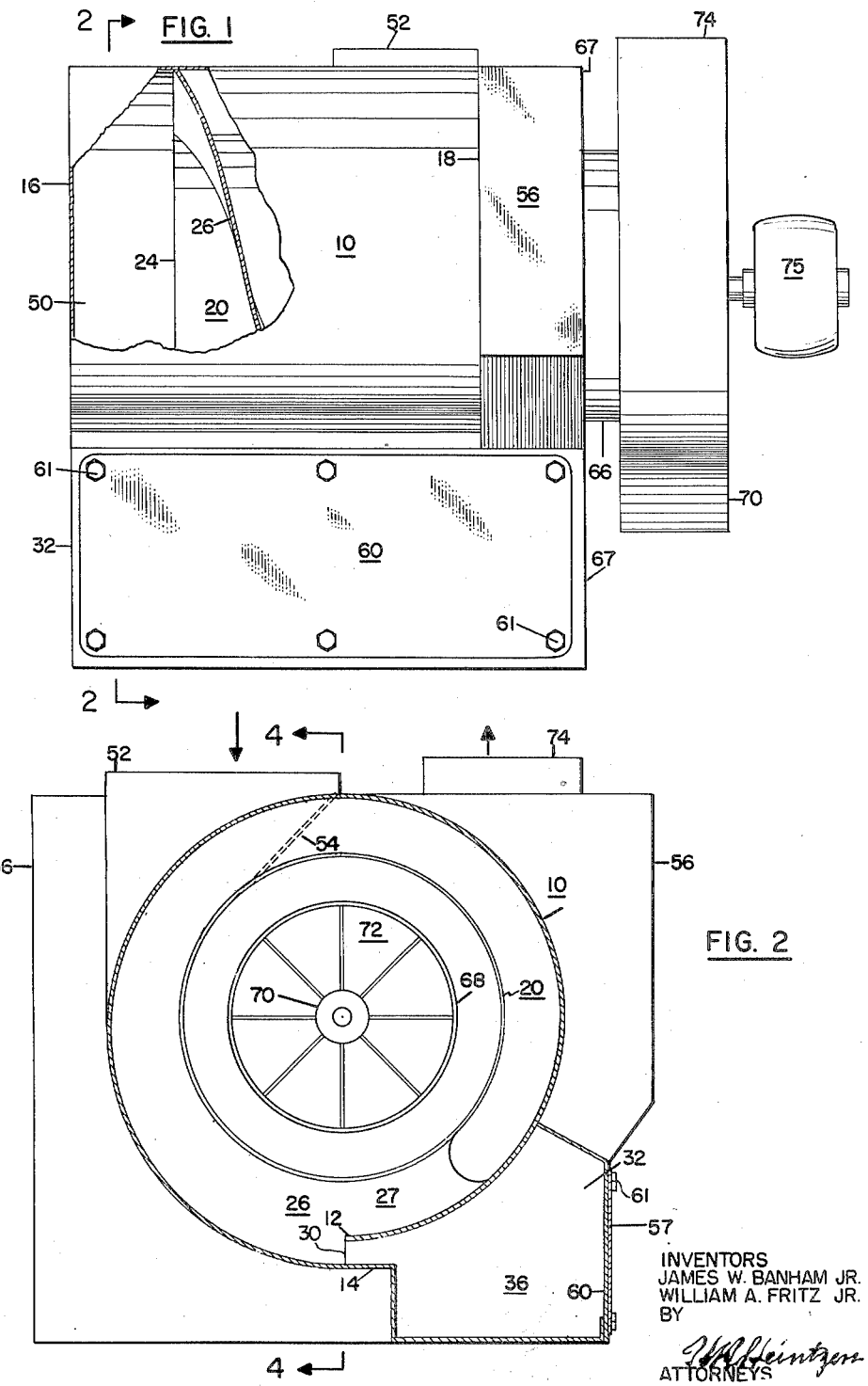

2,770,322

SPARK AND FLY ASH ARRESTOR

James W. Banham, Jr., Lansdowne, and William A. Fritz, Jr., Springfield, Pa., assignors to the United States of America as represented by the Secretary of the Navy Application May 20, 1954, Serial No. 431,304

2 Claims. (Cl. 183—80)

(Granted under Title 35, U. S. Code (1952), sec. 266)

The invention described herein may be manufactured and used by or for the Government of the United States of America for governmental purposes without the payment of any royalties thereon or therefor.

This invention relates to spark and fly ash arrestors and more especially to spark and fly ash arrestors suitable for use on war ships.

War ships must dispose of their rubbish and trash in such a manner that it does not betray the location of the ships to the enemy. Consequently, nothing which floats may be discarded overboard. Combustible material is usually burned. Such burning, however, tends to generate sparks which, especially at night, may reveal the position of the ships to the enemy. Even with especially designed trash burners, the generation of sparks cannot be avoided. Accordingly, spark and fly ash arrestors must be used to clear flue gases of such telltale evidence.

The elimination of sparks also eliminates one of the fire hazards on aircraft carriers where gasoline and gasoline vapors are apt to be ignited by the sparks. The spark arrestor also removes fly ash which tends to reduce visibility and pollute the air. The requirements for such a spark and fly ash arrestor are the usual requirements for war ship equipment, namely effectiveness, dependability, lightness and compactness. While this arrestor was designed for use on naval vessels, it finds application also on land where sparks and fly ash are to be eliminated.

It is accordingly an object of this invention to provide a compact, lightweight, and efficient spark and fly ash arrestor.

It is a further object of the invention to provide a spark and fly ash arrestor for the flue gases of a trash burner suitable for use on war ships.

Other objects and advantages of the invention will hereinafter become more fully apparent from the following description of the annexed drawings, which illustrate a preferred embodiment, and wherein:

Fig. 1 is an elevational view of the spark arrestor of this invention with parts broken away;

Fig. 2 is a sectional view of the line 2—2 of Fig. 1;

Fig. 3 is a view in perspective of the spark arrestor of this invention, but with the clean-out door and a part of the outer wall removed;

Fig. 4 is a sectional view on the line 4—4 of Fig. 2; and

Fig. 5 is an exploded view in perspective of some of the elements in the interior of the spark and fly ash arrestor.

Referring now to the drawings for a detailed description of the apparatus, the reference numeral 10 designates a rectangular sheet of metal having edges 12, 14, 16 and 18, the sheet being bent into the general form of a spiral with the edges 12 and 14 overlapping. A cylinder 20 having open ends 22 and 24 and of a length of somewhat less than the length of the edges 12 and 14 of the sheet 10 is located substantially concentrically in the spirally formed sheet 10 with the end 22 lying in the same plane as the edge 18 of the sheet 10.

A helically formed strip of metal 26 is located between the sheet 10 and the cylinder 20 to form a helical passage 28 therebetween. The helical strip 26 has steps 30 adjacent the edge 12 of the sheet 10. The left hand end of the metal strip 26 as viewed in Fig. 1 comprises a portion 27 which lies in the plane of the entrance end 24 of the cylinder 20 and slightly constricts the end of the helical passage 28. An inlet conduit 52 pierces the sheet 10 adjacent the edge 18 to conduct flue gases to the spiral passage 28, and a plate 54 deflects the flue gases to the left as viewed in Fig. 2.

An elongated container 32 is disposed adjacent the opening formed by the edges 12 and 14 of the sheet 10. Cross partitions 34 and 36 are provided in the container 32 and abut the steps 30 in the helical strip 26 to divide the container into three compartments 38, 40 and 42. The compartments 38, 40 and 42 are provided with clean-out openings 44, 46 and 48 respectively lying in one plane. An end wall 50 is secured to the edge 16 of the sheet 10 to close the spark arrestor structure at that edge. The wall 50 also forms the end wall of the compartment 42.

A substantially rectangular chamber 56 communicates with the end 22 of the cylinder 20 and comprises a wall 58 which abuts on the edge 18 of the sheet 10 and also forms one wall of the compartment 38. The substantially rectangular chamber 56 comprises a wall 67 and a recessed wall portion 57 with a clean-out opening 59 therein lying in the same plane as the clean-out openings 44, 46 and 48. A removable plate 60, secured in place by bolts 61, closes the openings 44, 46, 48 and 59.

A cylindrical conduit 66, disposed concentrically with the cylinder 20, pierces the wall 67 of the chamber 56, and a portion 68 of the conduit 66 reduced in size to a diameter smaller than that of the cylinder 20 extends into the end 22 of the cylinder 20. A flange 76 is affixed to the end 22 of the cylinder 20 and a flange 78 is secured to the conduit 66 and is spaced from the flange 76.

A suction blower 70 having an inlet 72 and an outlet 74 and driven by a motor 75 draws the flue gases from the spark and fly ash arrestor through the conduit 66. The outlet 74 of the suction blower 70 communicates with a stack (not shown).

The spark and fly ash arrestor is formed of sheet metal and all abutting metal elements, with the exception of the plate 60, are welded together.

Operation

The spark and fly ash laden flue gases from the trash burner (not shown) are drawn into the spark arrestor of this invention through the inlet conduit 52 and through the helical passageway 28 by the suction blower 70. As the fuel gases travel through the spiral passageway 28, the heavier sparks and fly ashes are thrown to the outside by centrifugal force, are skimmed off by the edge 12 of the sheet 10, and fall into compartments 38 or 40. On leaving the helical passage, the gases whirl around in the end adjacent the end wall 16 of the substantially circular chamber formed by the spirally shaped sheet 10. Here the edge 12 skims off some of the remaining sparks and fly ashes thrown outwardly by centrifugal force, and deposits them in the compartment 42.

The whirling flue gases are thereupon drawn through the interior of the cylinder 20. Since the cylinder 20 is of smaller diameter than that of the spirally formed sheet 10, the speed of rotation of the flue gases is increased, thereby correspondingly increasing the centrifugal force of the sparks and fly ashes which may still be entrained in the flue gases. The conduit portion 68 together with the cylinder 20 and the chamber 56 forms a cyclone separator which separates the remaining sparks and fly ash from the flue gases and deposits them in the chamber 56. The flanges 76 and 78 serve to retain this material in the chamber 56. The flue gases are then drawn through the conduit 66 by the suction blower 70 and discharged through the outlet 74 thereof to the ship's stack (not shown). The closure 60 is removed periodically to clean out the compartments 38, 40 and 42 and the chamber 56.

The blower 70 may be positioned anywhere in the path of the flue gases and may also be placed in advance of the trash burner to provide a forced draft. Its only function is to cause the flue gases to flow through the spark and fly ash arrestor with sufficient velocity to exert the necessary centrifugal force on the sparks and fly ash.

It will be apparent from the above that this invention provides a light weight and compact spark and fly ash arrestor. Its operation is reliable and efficient.

Obviously many modifications and variations of the present invention are possible in the light of the above teachings. It is therefore to be understood that within the scope of the appended claims the invention may be practiced otherwise than as specifically described.

What is claimed is:

1. A spark and fly ash arrestor comprising a horizontally disposed spiralled outer wall having vertically spaced overlapping inner and outer edges providing an extended outlet in the lower portion thereof, a cylindrical inner wall providing an outer annular passageway with the outer wall and an inner passageway, a compartment at one end of the housing interconnecting said passageways, a transverse strip within the annular space providing a helical path, a supply conduit in communication with the annular passageway for the admission of combustion products, means adjacent the other end of the housing for establishing flow of the combustion products through the helical path in the passageway and through the chamber and a lower compartment in communication with the extended outlet for receiving separated deposits from the flowing combustion products.

2. Apparatus as in claim 1 further characterized by the transverse strip having stepped portions formed therein to abut the inner overlapping edge of the outer wall to form separate outlets and partitions in the lower compartment aligned with the stepped portions to provide separate compartments.

References Cited in the file of this patent

FOREIGN PATENTS

| | | |
|---|---|---|
| 555,908 | Great Britain | Sept. 13, 1943 |
| 640,229 | Germany | Dec. 28, 1936 |